Sept. 23, 1958

C. H. HUGHES 2,853,440

FLOOR FOR BROAD COKE OVENS AND HEATING
FLUE-STRUCTURE THEREFOR AND METHOD
OF OPERATING THE SAME

Filed March 22, 1955

INVENTOR.
CHARLES.H.HUGHES
BY
[signature]
ATTORNEY

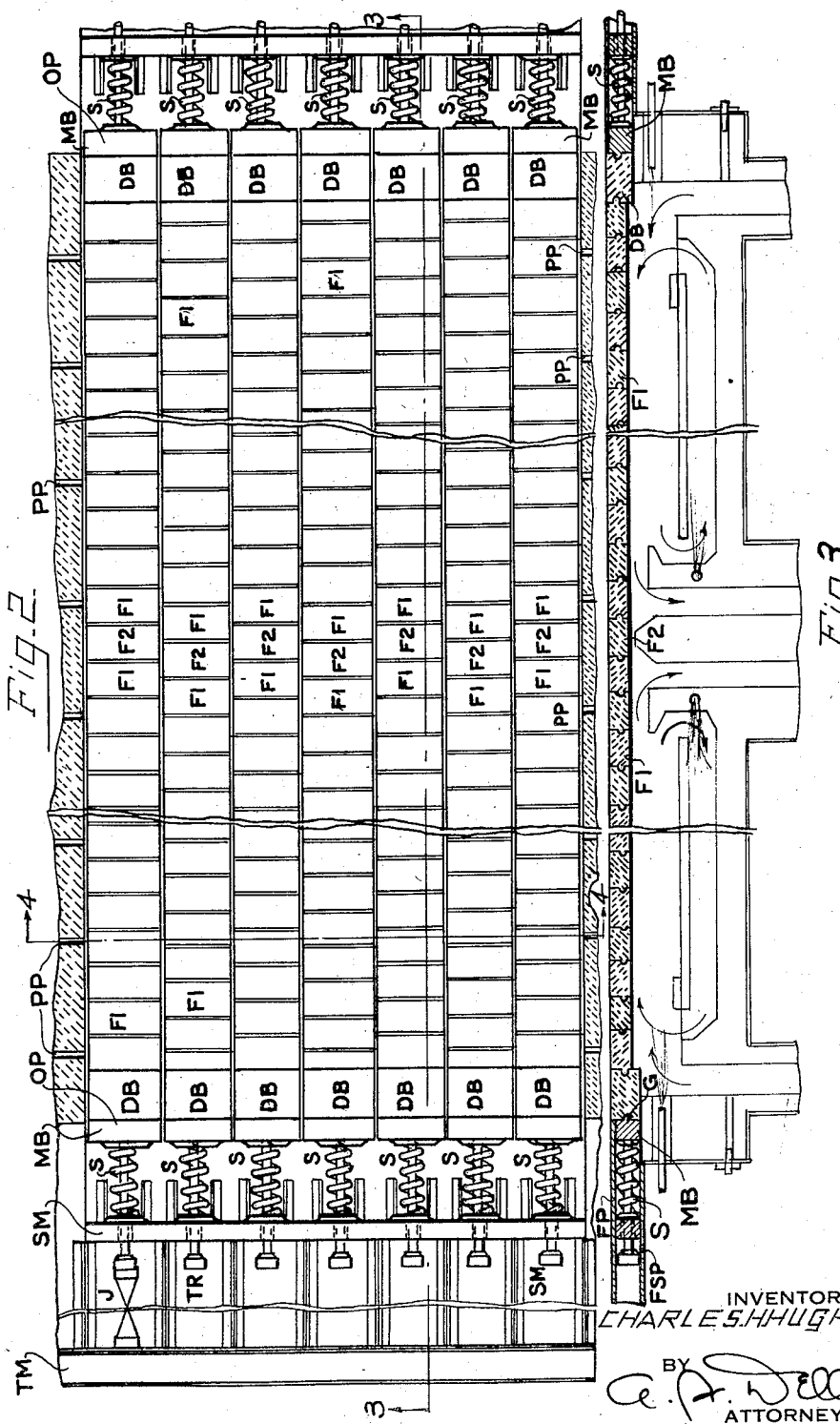

Sept. 23, 1958         C. H. HUGHES         2,853,440
FLOOR FOR BROAD COKE OVENS AND HEATING
FLUE-STRUCTURE THEREFOR AND METHOD
OF OPERATING THE SAME Filed March 22, 1955         7 Sheets—Sheet 3

INVENTOR.
CHARLES H. HUGHES
BY
ATTORNEY

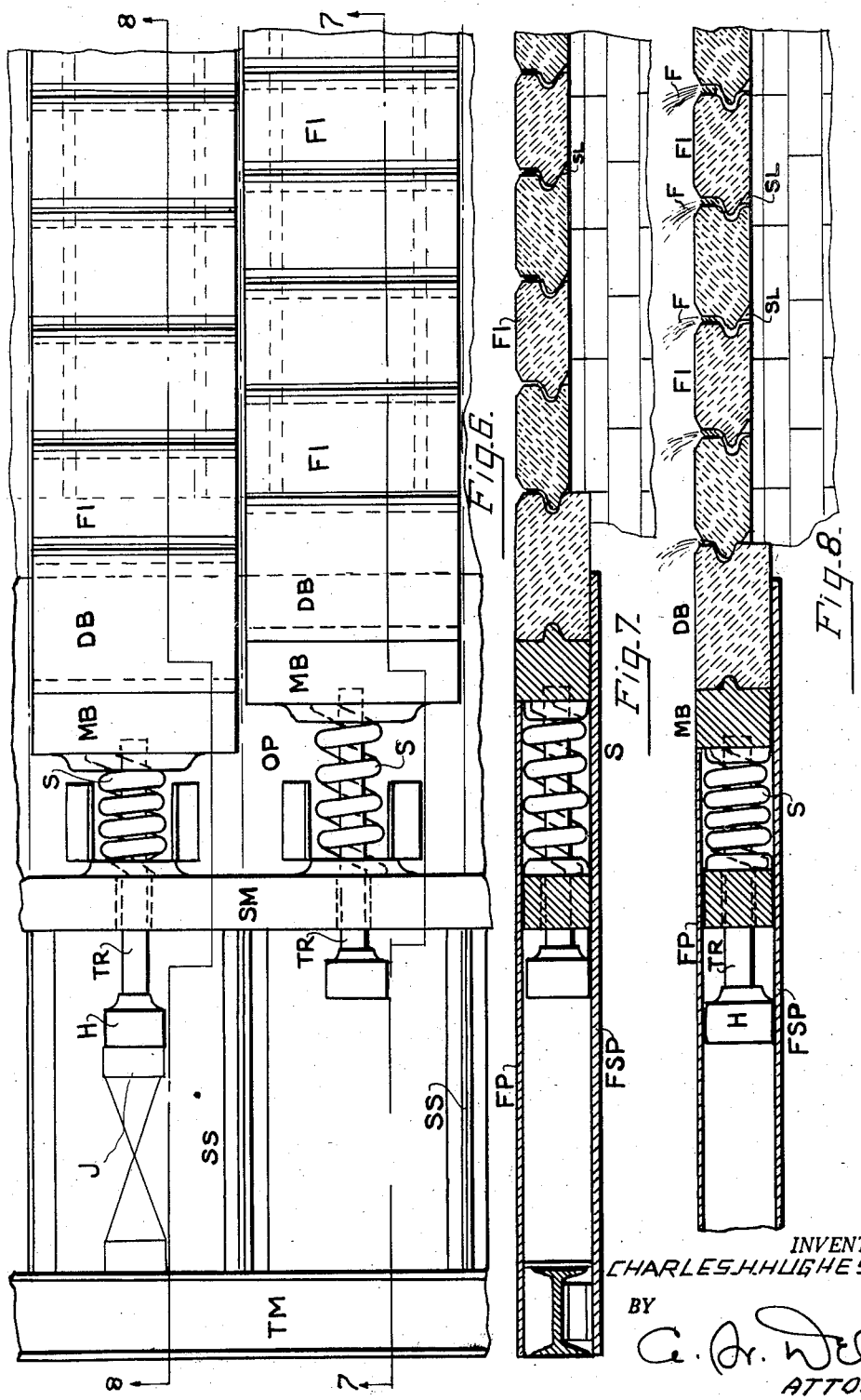

Sept. 23, 1958
C. H. HUGHES
2,853,440
FLOOR FOR BROAD COKE OVENS AND HEATING
FLUE-STRUCTURE THEREFOR AND METHOD
OF OPERATING THE SAME
Filed March 22, 1955
7 Sheets-Sheet 5
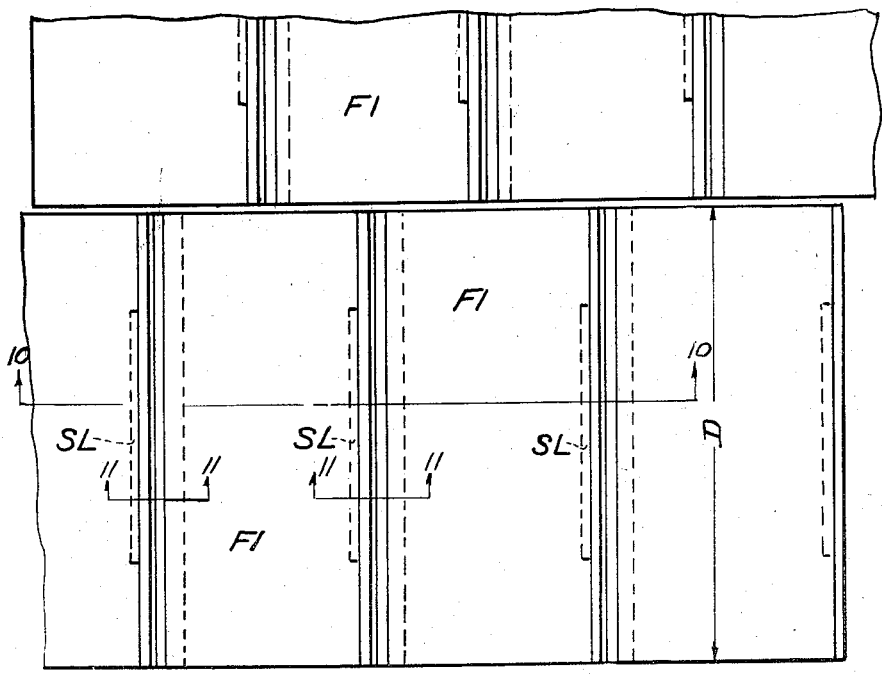
Fig. 9.
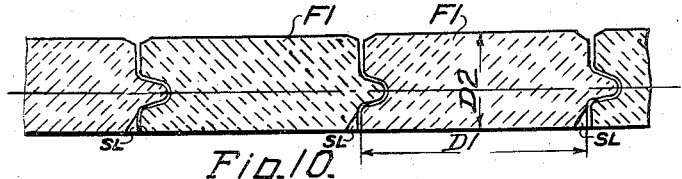
Fig. 10.
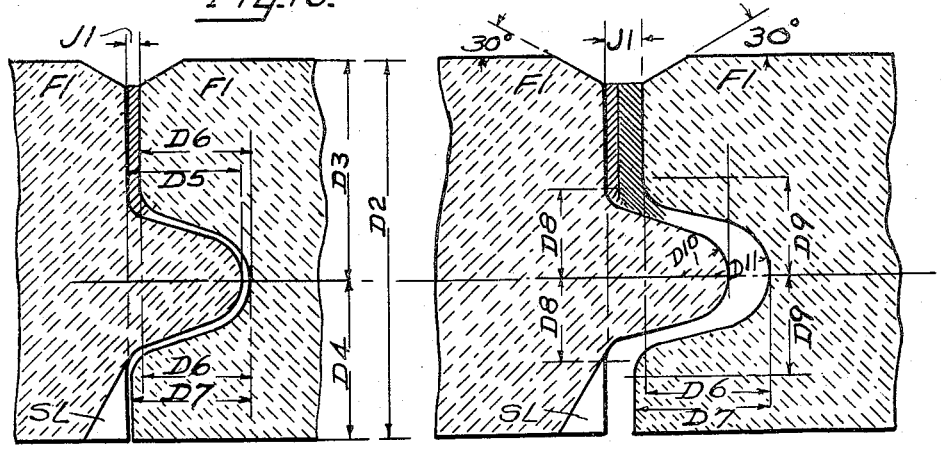
Fig. 11.
Fig. 12.
INVENTOR.
CHARLES H. HUGHES
BY
ATTORNEY Sept. 23, 1958 C. H. HUGHES 2,853,440
FLOOR FOR BROAD COKE OVENS AND HEATING
FLUE-STRUCTURE THEREFOR AND METHOD
OF OPERATING THE SAME
Filed March 22, 1955 7 Sheets-Sheet 6

INVENTOR.
CHARLES.H.HUGHES
BY
ATTORNEY

Sept. 23, 1958 C. H. HUGHES 2,853,440
FLOOR FOR BROAD COKE OVENS AND HEATING
FLUE-STRUCTURE THEREFOR AND METHOD
OF OPERATING THE SAME
Filed March 22, 1955 7 Sheets-Sheet 7

INVENTOR.
CHARLES H. HUGHES
BY
ATTORNEY

United States Patent Office 2,853,440
Patented Sept. 23, 1958

2,853,440

FLOOR FOR BROAD COKE OVENS AND HEATING FLUE-STRUCTURE THEREFOR AND METHOD OF OPERATING THE SAME

Charles H. Hughes, Glen Ridge, N. J., assignor to Hughes By-Product Coke Oven Corporation, New York, N. Y., a corporation of New York Application March 22, 1955, Serial No. 495,982

10 Claims. (Cl. 202—268)

The present invention relates to the art of broad coke ovens and, more particularly, to an improved oven floor and heating flue structure therefor and to an improved method of operating the same.

It is well known that the earliest records of the art show that rectangular or retort ovens were constructed and their operation attempted in Germany about 1830. Knab in 1858 patented his flat rectangular ovens to recover by-products and illuminating gas from the coking of coal. The Knab ovens had no regenerator or recuperator system (see U. S. Patent No. 19,575 of March 9, 1858). Moreover, there was no attempt in the Knab oven to provide uniform heating to the oven floor. Although various endeavors were made, it was not until the granting of the Zwillinger patents that the art was provided with a more modern design of a rectangular oven (see U. S. Patents No. 1,656,617 of January 17, 1928; No. 1,428,621 of September 12, 1922; and No. 1,428,622 of September 12, 1922). In recent years, broad coke ovens of the rectangular type were constructed using prior art broad oven designs and more particularly such designs as illustrated by U. S. Patent No. 1,635,280 of July 12, 1927 granted to Alexander S. Knowles and Charles V. McIntire. Various embodiments of this oven design have been constructed and the operation thereof attempted. However, those skilled in the art know that these broad ovens were dismantled as they failed to operate satisfactorily in industrial service for the production of commercially acceptable products. One of the principal problems confronting oven designers in the constructing of all types of coke ovens including the vertical type and the broad rectangular type of oven was the provision of a satisfactory oven floor.

A survey and analysis of the oven floor problem showed that the construction of heating systems and of refractory materials used played an important role. Thus, the refractory material used in the construction of the earliest ovens was ordinary fire clay which was useful only at low temperatures. Later a refractory material was used consisting of a higher percentage of silica to improve the heat transfer. Prior bricks and tile used in the heating systems of all ovens were without tongues and grooves to prevent leakage between the oven and heating flues. The next attempt to solve the problem of gas leakage was the construction or manufacture of large hollow tile on the order of shapes about 24 inches high, about 12 inches wide by about 18 inches long. The tile made in wood molds was known as Belgian tile. The refractory material was a mixture of fireclay and finely ground pottery, such as porcelain dishes (refuse from potteries). This Belgian tile was provided with small tongues and grooves which were intended to prevent gas leakage. However, due to the short length of the tongue, gas leakage occurred, caused by the unequal expansion of the tiles of hollow shapes forming the side wall heating flues. Later when faster coking time and higher temperatures were needed in the oven heating system for the production of larger tonnages of coke, the oven linings and heating flue systems were constructed of silica shapes employing small tongues and grooves. The high narrow or vertical coke ovens as built today are constructed of various sizes of silica shapes using small tongues and grooves. The tongue and groove design was used among other reasons to prevent leakage between the oven chamber and the heating system and to hold the broken or cracked sections of the silica shapes in place in the wall. It is well known to those skilled in the art that balanced pressure conditions must be maintained between the coke oven coal charge and the heating flue system in order to prevent the leakage of the rich gas evolved in the oven during the coking of the coal into the oven heating flues. It is quite often the practice to stop the supply of fuel gas into the oven heating flues for long intervals during the coking period of the coal, because of this leakage due entirely to the fact that tongues and grooves of a sufficient length and depth cannot be used in silica shape design since their use would necessitate unbalanced design of the silica shape. The length of tongues and depth of grooves must be small so as not to introduce in the shape of the silica tile changes in the thickness of certain parts of any silica brick as it will crack while being burned in the kiln during manufacture or later in service due to pressure or changes in temperatures. It is mainly for this reason that the silica shapes used in the modern application of silica floors to what has been designated as Knowles ovens has produced such failures as to cause the trade to abandon the Knowles oven for use on an industrial scale for the production of commercially acceptable products. The design of a floor shape is an important factor in the success or failure of any type of rectangular oven. This fact was not recognized by any designer of broad ovens prior to Hughes' inventions. Take for instance, the design as illustrated in Fig. 1 of the B. Zwillinger Patent No. 1,656,617 (January 17, 1928), a ship lap design of floor tile was used. Unequal thickness of various parts of the floor tile caused the ship lap section to break from the thick section of the tile. Referring to U. S. Patent No. 1,635,280 to A. S. Knowles et al. (July 12, 1927), and particularly to Fig. 5, it will be observed that the silica floor tile is U-shaped. The design of floor tile in service parted as it was unbalanced design. The legs of the tile forming the U broke off due to change in the thickness of material between the legs and the main body of the shape. Likewise, the tongues and grooves shown in Fig. 6 were necessarily so small due to the thickness of the floor section of the shape that they did not prevent leakage and sections of the grooves broke away from the tile.

Although many attempts were made to overcome the foregoing difficulties, shortcomings, and other disadvantages, none, as far as I am aware, was entirely successful when carried into practice commercially on an industrial scale.

It has now been discovered that after extended experiments, research, and practical tests that the outstanding problem can be solved in a simple and completely satisfactory manner.

It is an object of the present invention to provide an improved tile floor for broad coke ovens which eliminates the aforesaid difficulties and disadvantages.

Another object of the invention is to provide an improved floor for broad coke ovens which prevents leakage of oil and/or gas from the coking chambers into the floor heating flues and vice versa.

The invention also contemplates providing a novel structure permitting the burning of carbon or carbonaceous material from the space situated between adjacent floor tiles in which carbon, etc., accumulates during the operation of broad coking ovens.

The invention further contemplates providing a novel combination capable of forcing the individual tiles constituting the oven floor into a position approximating that of the original "laid-up" position after carbon or carbonaceous material has been burned from the joints between adjacent tiles.

It is a further object of the invention to provide novel structural means for maintaining the expanding floor tiles in close contact with each other while the broad coking ovens are being heated and operated.

Still another object of the invention is to provide a unique oven floor structure which is capable of being used in an improved broad coking oven which can produce high quality coke including electrode coke, high B. t. u. gas, and valuable by-products including cracked hydrocarbons without the loss of time which is usually required in the reconstruction of oven floors laid directly over the floor heating flues.

It is likewise within the contemplation of the invention to provide a novel oven structure with a special tongue and groove construction of the walls forming the heating flues under the oven floor which are capable of resisting gas and/or oil explosions in the heating flues and of holding the supporting walls in alignment.

Among the further objects of the present invention is the provision of an improved broad oven provided with means for burning off oil carbon, etc., which accumulates on the exposed top surface of the oven floor, in the joints between adjacent floor tiles, and on the surfaces of the side walls of the rectangular oven when oil, tar, etc., is heated and coked.

Other objects and advantages will become apparent from the following description taken in conjunction with the accompanying drawings, in which:

Fig. 2 illustrates a plan view of the novel oven floor structure taken on line 2—2 of Fig. 1 with special tiles and with special means for holding the floor tile in proper position during the expansion of the floor due to the deposit of carbon between the joints between adjacent floor tiles;

Fig. 3 depicts a vertical longitudinal section taken on the line 3—3 of Fig. 2 showing the new floor arrangement together with waste gas recirculation flues;

Fig. 6 is a plan view taken at the end of two rows of oven floor tile to illustrate the difference in expansion of the tile and spring compression;

Fig. 7 is a vertical section taken on the line 7—7 of Fig. 6 to show the floor as "laid-up";

Fig. 8 shows a vertical section taken on the line 8—8 of Fig. 6 to illustrate the tile over an adjoining flue expanded and the difference in expansion which takes place when one row of tile is affected differently by the coking conditions from an adjoining row of floor tile;

Fig. 9 is a plan view of any part of the floor taken to illustrate the position of the tiles with respect to each other and the detail of the floor tile showing the length, width and thickness of floor tile as required for balanced design in accordance with the principles of the present invention;

Fig. 10 depicts a vertical sectional view taken on the line 10—10 of Fig. 9 to illustrate the required width and thickness as compared with the length of the shape and provision for air to be used for burning carbon from the joints between the tile;

Fig. 11 is a detail view of the tongue and groove of the floor shape embodying balanced design and the deep contact surface needed to prevent leakage from the oven into the oven heating flue;

Fig. 12 is likewise a detail view of the tongue and groove and air inlet shown in position acquired when carbon accumulates in the joint between the tiles prior to forcing them into the "laid-up" position;

Generally speaking, the present invention contemplates the use of certain silicon carbide shapes or silica shapes so designed as to make more or less permanent the construction of an oven floor, the stoppage of leakage of the oil or gas from the oven into the oven heating system and means for relocating said floor tile after the carbon which moved the floor tile has been burned out and means for burning out the carbon deposited over the wall surface of the oven.

Figure 4:
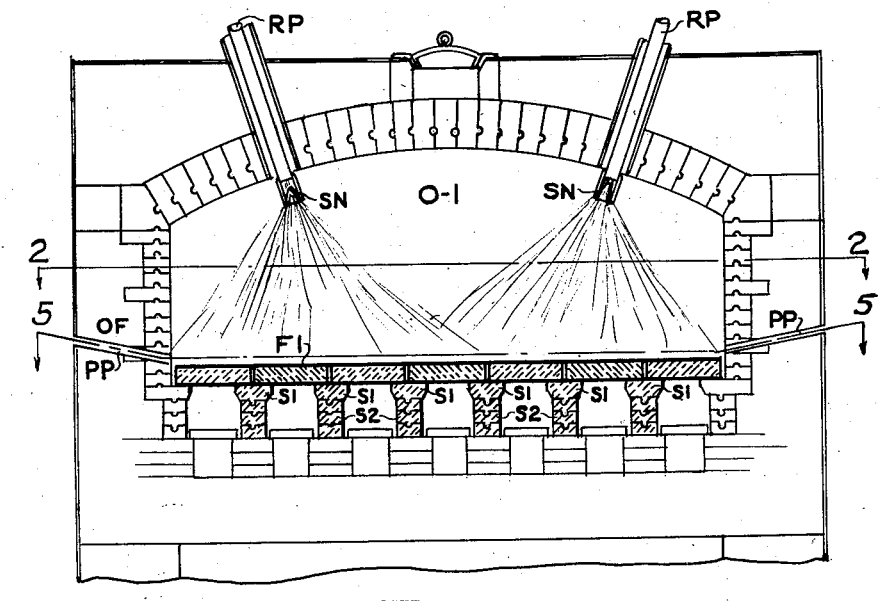
Fig. 4 is a vertical cross sectional view of an improved broad oven for coking oil taken on the line 4—4 of Fig. 1 showing the novel floor structure supported on the heating flue walls which are constructed of special tongue and groove shapes.

Referring more in detail to the drawings, it will be understood that as illustrated in Fig. 4 the coking oven embodying my invention comprises an arched rectangular broad chamber O-1 in which the fluid hydrocarbon mass such as oil residue, tar, or the like is heated and distilled leaving carbon which is one of the products of the reaction or heat treatment on the floor of the oven to be coked. The oil is introduced into the oven through removable pipes R–P and distributed over the oven floor by means of spray nozzles S–N or the oil is introduced into the oven through openings PP in the oven side walls.

Figure 1:
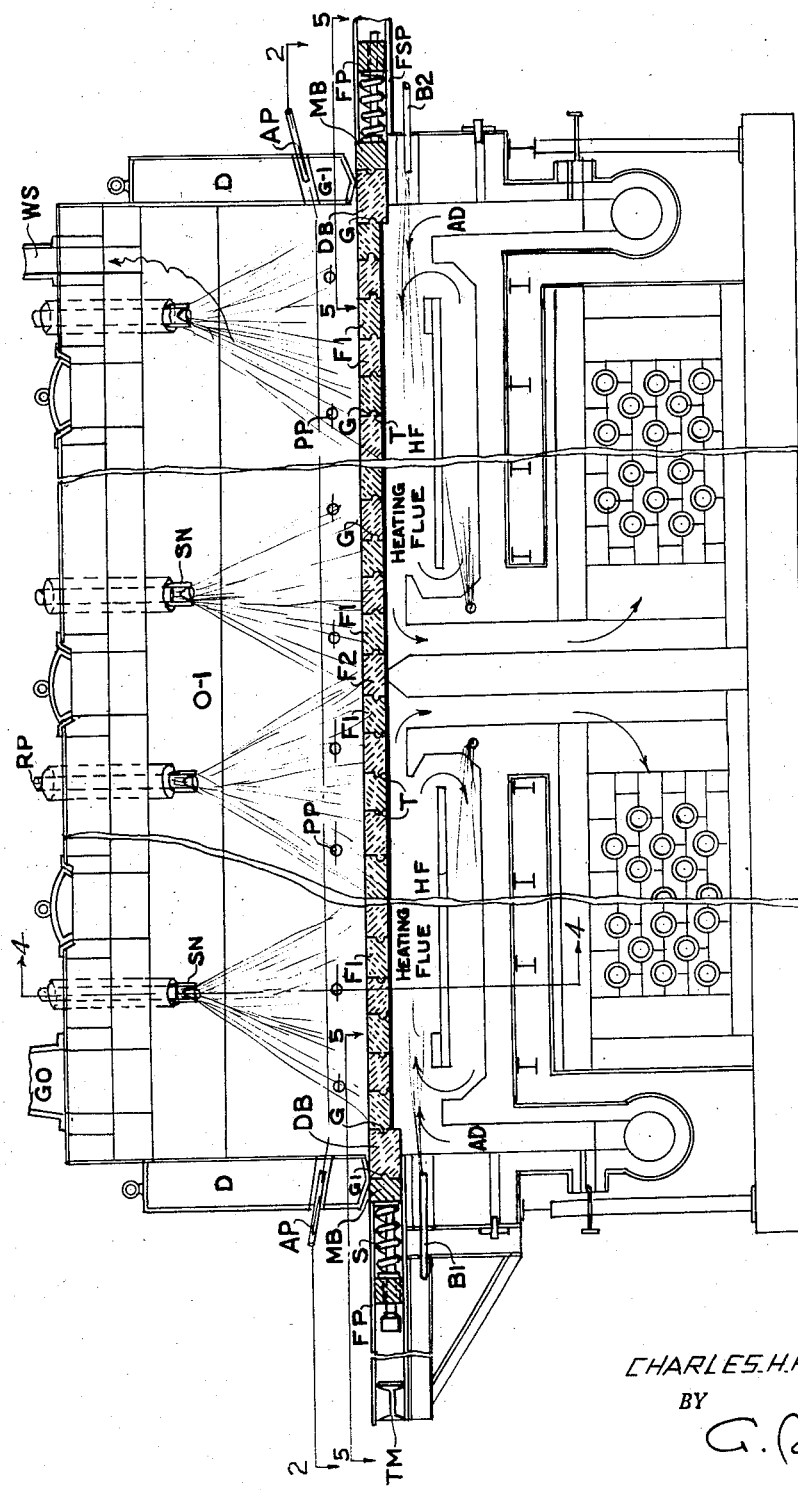
Fig. 1 is a vertical longitudinal sectional view of an improved broad coking oven with tubular recuperators, floor heating flues, waste gas recirculation flues, and the novel oven floor embodying my invention.
Figure 5:
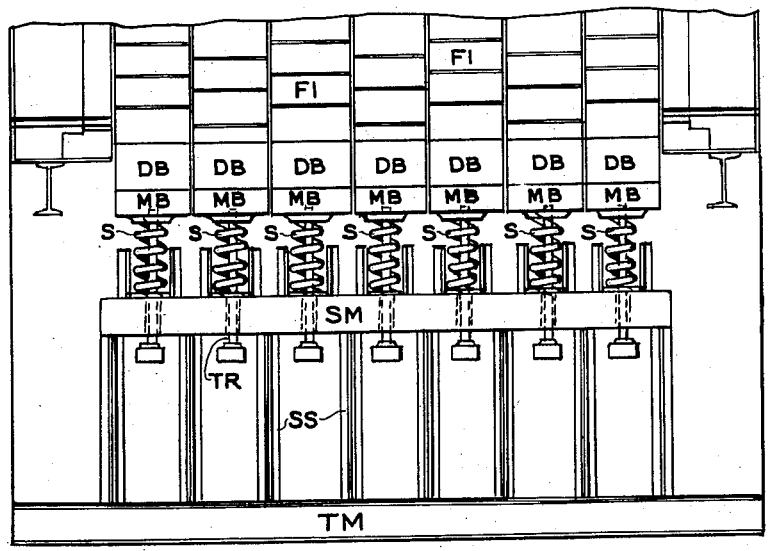
Fig. 5 illustrates a plan view of the novel oven floor taken on the line 5—5 of Figs. 1 and 4 showing the special construction at each end of the oven and the means for permitting the floor tile to move in close contact against uncontrolled expansion.

As stated hereinbefore, the present invention is to provide a floor for the improved broad coke ovens in such a manner as to solve the old problem of gas or oil leakage with shapes of balanced design. Such a floor is illustrated by the use of floor shapes F–1 and F–2 and means for keeping the floor tile in the original laid-in position or relocating them with a movable standard air or hydraulic pressure jack. The floor as shown is assembled as follows: Shape F–2 (see Figs. 1, 2, and 3) is placed on the center line of the oven, then shapes F–1 are laid so that tongues T (see Fig. 1) all face toward each end of the oven.

It has been found that when the tiles are shoved toward the center of the oven by the jack, each tongue T slides freely into its respective groove G. The tongue on tile F–1 enters the groove G in door sill block D–B. Tongue G–1 on the sliding metal block M–B (see Fig. 2) transmits the expansion into resilient means, such as spring S.

Figure 16:
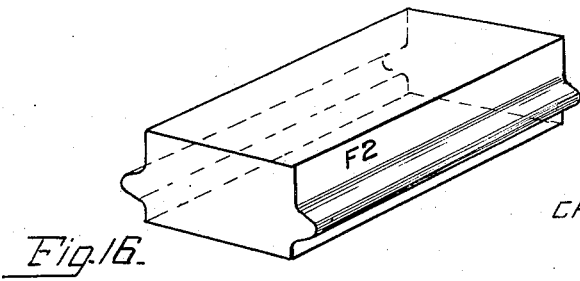
Fig. 16 is also a perspective view of a double tongue floor shape used for changing the direction of the floor tile as "laid-up" so that starting with the center of the oven all tongues on the floor shapes point towards the ends of the oven.

The floor design as illustrated in Figs. 2 and 3 will now be described in detail. The oven floor is laid with shape F–2 on the center of the oven and this shape is provided with a double tongue shape (see Fig. 16); all the floor shapes F–1 have the tongue pointing toward each door sill block D–B at each end of the oven. Metal blocks M–B are individual to each row of floor tile and move with the floor tile. Structural member S–M is permanently fixed in place so that it will not move. Structural thrust member T–M is also in a fixed position. Thrust rod T–R is attached to the metal block M–B and spring S is placed around the rod T–R. This rod passes through fixed structural member S–M which has a clearance around the rod T–R. As the floor tile expands, the spring S bearing against the fixed member S–M is compressed permitting the rod T–R to extend beyond the fixed member S–M as illustrated in Fig. 6. Some rows of tile do not expand as much as other rows. After the carbon is burned out of the brick or tile joints, then a jack J (see Figs. 2 and 6) which may be hydraulically, electrically, mechanically, or pneumatically operated, is placed against fixed member T–M and the head H of rod T–R and the tile are shoved back into the original position designated as O–P. Two jacks used simultaneously are placed at the end of each row of tile at opposite ends of the row.

Figure 13:
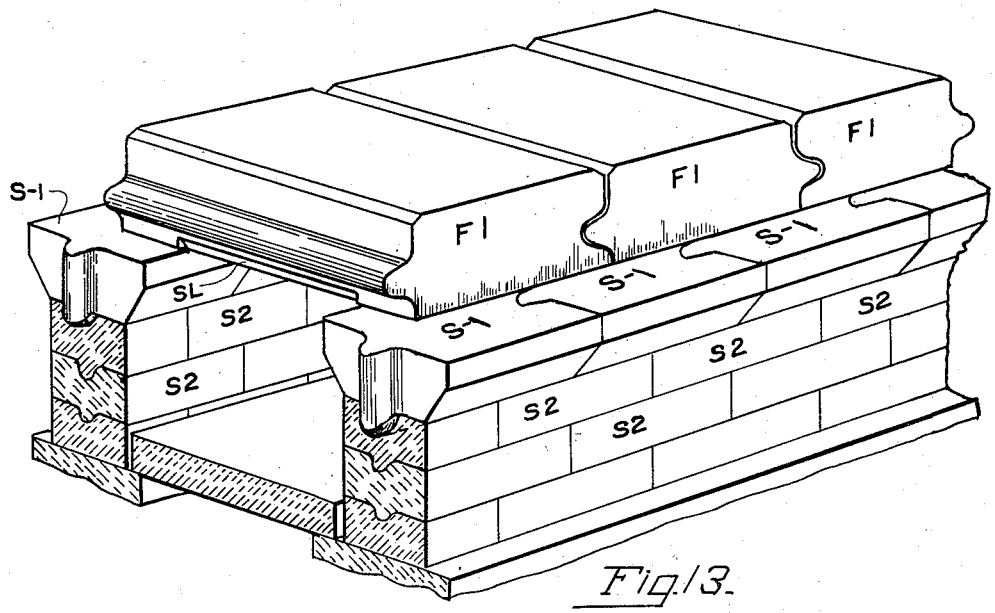
Fig. 13 shows a perspective view illustrating the assembly of the oven floor tile and heating flue walls.
Figure 14:
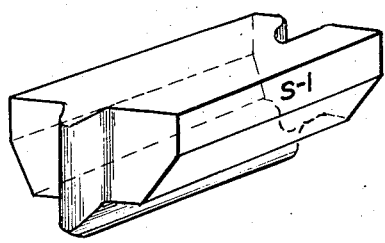
Fig. 14 depicts a perspective view of the special tongue and groove shapes upon which the floor is supported.
Figure 15:
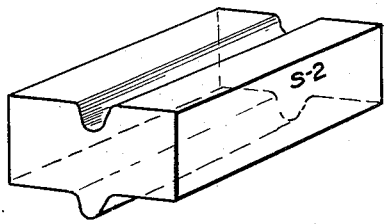
Fig. 15 illustrates a perspective view of tongue and groove brick used in the construction of all of the heating flue walls supporting the oven floor.

During the operation of the oven, floor plate F–P is located as shown in Figs. 7 and 8. Such a plate is removed whenever it is necessary to use a jack for relocating the floor tile. The thrust of the springs S upon fixed structural member S–M is transmitted to fixed member T–M through compression structural members SS (see Fig. 6). Door sill block D–B and metal block M–B slide on fixed steel plate F–S–P. The oven floor shapes F–1 and F–2 are supported by tongue and groove shapes S–1 and S–2 (see Figs 4 and 13).

The best and most practical design of floor shape F–1 is illustrated by Figs. 9, 10, 11, and 12. Dimension D (length of floor shape) is preferably of the order of about 13¾ inches, D–1 (width) is one-half of the length of D or about 6⅞ inches while the thickness D–2 must be about one-third to about one-fourth of the length or about 3 inches to 4 inches depending upon the refractory material used in the manufacture of shapes F–1 and F–2. In other words, when D is the length of the floor shape or tile, D–2 approximately equals the width and D–3 to D–4 approximately equals the thickness. Such dimensions have been demonstrated by practical tests to be of the proven effective size. The location of the tongue and groove has likewise been proven.

It has been found that in order to provide the necessary depth of vertical joint surface between the tile, dimension D–3 should be about 1¾ inches and D–4 about 1¼ inches when the silicon carbide shape is three inches thick and in the same relative proportion when a silica tile is four inches thick. Another very important feature of the design is the length of the tongue and depth and position of the groove. The length of the tongue D–5 should be about 15/16 of an inch while the upper part of the groove D–6 should be about one inch with the lower half of the groove D–7 about 1 1/16 inches. This change in dimensions between D–6 and D–7 provides for a space between the bricks F–1 at the top for packing while the lower part of the bricks F–1 are in contact and provide a tight brick to brick joint. The width of the tongue at the base dimension D–8 is about 11/16 of an inch while the width of the groove dimension D–9 is about 13/16 of an inch. Dimension D–10 at end of the tongue has a radius of about ⅜ of an inch and dimension D–11 in the groove has a radius of about 7/16 of an inch. The average width of the tongue at the base is about 1¼ inches while at the tip of the tongue the width is about ¾ of an inch. This long tongue provides a shelf for the deposition of carbon which closes the joint between the brick surfaces and, together with the packing and carbon in the vertical joint, prevents the leakage of gas and oil at the time the tile floor is laid in place in joint J–1, which is about ⅛ of an inch wide and is filled or packed with a high temperature mineral wool made either of kaolin clay or glass fibre while at times a high temperature tar pitch is used.

Figure 17:
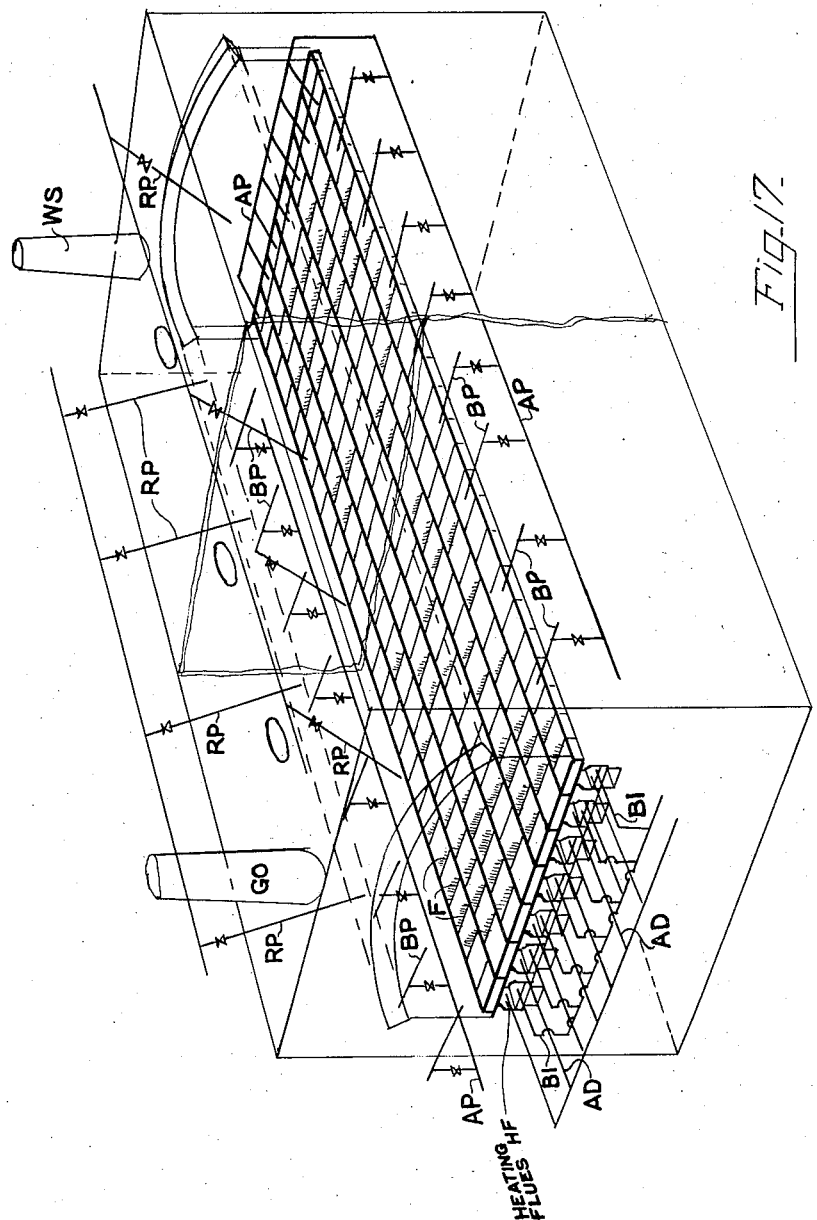
Fig. 17 illustrates a diagrammatic perspective view of the ovens clearly showing the flow of gas, air, fuel oil or tar therein and the manner in which the air is used to burn out the carbon from between the floor tile and off the oven walls.

During continued operation of the oven when coking oil, carbon laden gases and thin tars penetrate the joint and the hard baked or coked carbon in time grows in width and the force exerted shoves all the F–1 shapes apart. These joints J–1 in time will be at least ⅜ of an inch wide and it is at this stage or time of operation when the accumulated deposit of carbon has added at least eight inches to the overall length of each row of F–1 floor shapes. This displacement of the floor tile determines the time when all the carbon must be burned out of the brick joints. In addition to the importance of the length of the tongues, it is important that the lower edge of the F–1 shapes be provided with an enlarged sloping opening to promote the upward circulation of air from the heating flues needed for burning the carbon. Sloping surface S—L (see Figs. 9, 10, 11, 12, and 13) serves to direct the flow of the air upward from the floor heating flues. The burning out of the carbon between the joints can best be understood by referring to Figs. 7, 8, 10, 11, 12, and 13. Air pipes A–P (see Fig. 17) are arranged along each side of the oven and across the ends of the oven. Branch pipes B–P are extended into the oven through openings P—P as shown in Figs. 4 and 17 and through each oven door shown in Fig. 1. A gas off-take G—O and waste gas stack W—S (see Figs. 1 and 17) are arranged at opposite ends of each oven. Immediately following the pushing of the coke from the oven while the floor bricks are at a temperature of about 1800° F., the oven doors D (see Fig. 1) are closed. The fuel gas entering the burners B–1 and B–2 is increased in volume as well as the preheated air entering the heating flue H—F through ducts A—D. Simultaneously, air is blown into the oven from both longitudinal sides of the oven and oven doors through air pipes A—P and B—P and instantly the carbon begins to burn from between the joints off the walls and from the oven floor surface. Valves in the gas offtake pipe G—O and waste gas stack W—S are opened and the products of combustion flow to the atmosphere. The increased volume of fuel gas preheated air to the heating flues H—F produce a pressure and the excess air enters openings S—L (see Figs. 8, 10, 11, and 12) and burns out the carbon deposited between all brick joints J–1 (see Figs. 11 and 12). Hot burning carbon gives a bright flame F which can be seen burning upward from all brick joints as illustrated in Figs. 8 and 17. The burning out of the carbon varies from about four hours to about twenty-four hours depending upon the A. P. I. of the oil coked. Immediately following the burning-out period, jacks J are used alternately, simultaneously at opposite ends of each row of floor tile to return the tile to their original laid-in position. One advantage of this method of operation is to maintain and at times increase the heat storage in the oven floors and walls of the oven. Immediately following the carbon burn-off period, the doors are again luted to prevent oil leakage. Oil is again on stream into the oven through pipes R—P (see Figs. 1 and 4). The oil is distributed by means of spray nozzles S—H and the coking of oil carbon is resumed. The oil vapors leave the oven through gas off-take pipe G—O, the circulation through the waste gas stack W—S having been stopped.

It is to be observed that the present invention provides an oven floor shape or tile having a balanced design in which the various parts, especially the tongue and groove, have relative thicknesses with respect to the main body of the shape or tile so as to retain approximately the same percentage of moisture throughout all parts during the drying and/or burning in a brick kiln and such as to provide a strong and durable structural unit of construction.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. In a broad coking oven, for the production of high quality coke including electrode coke, high B. t. u. gas, and valuable by-products including cracked hydrocarbons from fluid hydrocarbon mass, including oil and tar, said oven being provided with a coking chamber, a plurality of inlet pipes associated with said coking chamber for the introduction of a fluid hydrocarbon mass including oil and tar, said chamber being of an elongated rectangular shape, a door at each end of the chamber for sealing the same, and a plurality of heating flues underneath the floor of the coking chamber; the improvement comprising a floor comprising a single horizontal layer constituted of a plurality of longitudinal rows of interlocking heat-transmitting tiles with longitudinal joints between adjacent rows, a long tapering tongue projecting from one end of each tile to provide a shelf for the deposition of carbon and to extend into a longer cooperating groove of an adjacent tile, packing inserted between adjacent tiles to provide a clearance space between the end of each long tapering tongue and its cooperating groove, vertical refractory units supporting said rows of tiles at said longitudinal joints, auxiliary air inlets cooperatively associated with said single layer of floor tile to provide air during the burn-off period, resilient means located at each end of each row of the heat-transmitting floor tiles to yield and thereby protect the floor tiles from detrimental and destructive stresses due to thermal expansion and to maintain the expanding floor tiles in close contact with each other while the coke oven is being heated and operated and means to receive a pressure jack to be positioned between each end of each row of the heat-transmitting floor tiles and a cooperating fixed member adjacent thereto to return the tiles to their original laid-up position whereby leakage of gas and/or fluid hydrocarbon mass including oil or tar is prevented from the coking chamber to the floor heating flues and vice versa and whereby carbon accumulated between the packing and the wall of the adjacent tile above the said shelf during the coking operation of the oven is burned with air during the burn-off period.

2. The improved floor set forth in claim 1 in which the joints between the long tongues and longer grooves of adjacent tiles are packed with a high temperature packing containing mineral wool and kaolin clay.

3. The improved floor set forth in claim 1 in which the floor tiles are composed of a refractory material of the group consisting of silicon carbide and silica.

4. The improved floor set forth in claim 1 in which each tile has a width of about one-half of the length and a thickness of about one-third to about one-fourth of the length.

5. The improved floor set forth in claim 1 in which each floor tile has a length of about 14 inches, a width of about 7 inches, and a thickness of about 3 to about 4 inches, and has a long tapering tongue having a length about one inch long and a thickness at its root of about 1¼ inches thick and has a longer cooperating groove having a depth greater than the length of said long tongue to provide a clearance space.

6. The improved floor set forth in claim 1 in which each of said rows has a center tile provided with a long tongue on each end thereof and the tiles on one-half of the oven having their long tongues pointed towards one door and those on the other half having their long tongues pointed towards the other door.

7. The improved floor set forth in claim 1 in which each of said tiles has sloped upper corners.

8. The improved floor set forth in claim 1 in which each of said tiles has upper angular corners of about 30°.

9. The improved floor set forth in claim 1 in which the auxiliary air inlets are arranged at spaced intervals along the side walls of the oven just above the floor.

10. The improved floor set forth in claim 1 in which a door sill block and an associated metal block are positioned at the ends of each row and are located between the end tile and the resilient means.

References Cited in the file of this patent

UNITED STATES PATENTS

| | | |
|---|---|---|
| 1,266,745 | Wundrack | May 21, 1918 |
| 1,355,115 | Cook et al. | Oct. 5, 1920 |
| 1,428,621 | Zwillinger | Sept. 12, 1922 |
| 1,793,179 | Patton | Feb. 17, 1931 |
| 1,896,669 | Frisch et al. | Feb. 7, 1933 |
| 2,376,718 | Otto | May 22, 1945 |

FOREIGN PATENTS

| | | |
|---|---|---|
| 500,758 | Belgium | July 23, 1951 |
| 676,754 | Great Britain | July 30, 1952 |